United States Patent [19]

Fukuhara

[11] Patent Number: 4,594,594

[45] Date of Patent: Jun. 10, 1986

[54] LORAN SIGNAL RECEIVER

[75] Inventor: Hiroshige Fukuhara, Yokosuka, Japan

[73] Assignee: Nissan Motor Company, Limited, Japan

[21] Appl. No.: 608,576

[22] Filed: May 4, 1984

[30] Foreign Application Priority Data

Sep. 2, 1983 [JP] Japan .............................. 58-161724

[51] Int. Cl.$^4$ ............................................. G01S 1/24
[52] U.S. Cl. .................................................. 343/389
[58] Field of Search ......................... 343/388, 389, 390

[56] References Cited

U.S. PATENT DOCUMENTS

| 3,934,254 | 1/1976 | Vogeler et al. | 343/390 |
|---|---|---|---|
| 3,947,849 | 3/1976 | Fehlner | 343/389 |
| 4,166,275 | 8/1979 | Michaels et al. | 343/389 |
| 4,224,623 | 9/1980 | Mercer et al. | 343/390 |
| 4,268,830 | 5/1981 | Brodeur | |
| 4,468,668 | 8/1984 | Brodeur | 343/389 |

FOREIGN PATENT DOCUMENTS 58-72073  4/1983  Japan .................................... 343/389

OTHER PUBLICATIONS

O'Halloran et al, "Use of Loran-C in AVM and C$^2$ Systems," 1980 Carnahan Conference on Crime Countermeasures, University of Kentucky, May 14–16, 1980.

Primary Examiner—Theodore M. Blum
Assistant Examiner—David Cain
Attorney, Agent, or Firm—Lowe, Price, LeBlanc, Becker & Shur

[57] ABSTRACT

A received signal containing a loran-C signal is periodically sampled. The sampled data values in two successive periods of the loran-C signal are stored in corresponding first and second period areas of a memory. The sampled data values for the next successive pair of periods of the loran-C signal are added to corresponding sampled data values stored in the memory. Such adding operation is repeated for a plurality of subsequent first and second periods of the loran-C signal. First and second groups each including a fixed number of totalled values are read from the first and second period areas, respectively, of the memory. The fixed number matches the number of pulses in each loran pulse group. The totalled values are read from memory addresses separated in coincidence with the separation of pulses in each loran pulse group. Each of the first and second groups of read values are processed in accordance with the known phase coding of each group of loran pulses. These processed values of the first and second groups are added and stored in corresponding memory address. The reading, processing, adding and storing steps are repeated until every possible combination of totalled values satisfying the separation criterion has been processed. Each of the loran pulse groups within each pair of successive loran-C signal periods is located according to which groups of values exactly match the known phase coding of each loran-C pulse group.

13 Claims, 15 Drawing Figures

FIG.7A
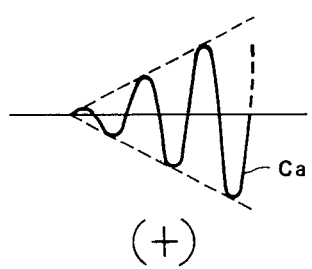
(+)
FIG.7B
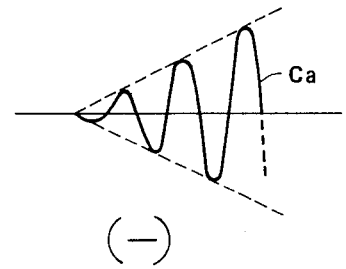
(−)
FIG.8
Ⓐ + + − − + − + −
Ⓑ + − − + + + + +
|  |  | 1 | 2 | 3 | 4 | 5 | 6 | 7 | 8 |
|---|---|---|---|---|---|---|---|---|---|
| MASTER STATION ① | 1ST PERIOD |  |  | ○ | ○ |  | ○ |  | ○ |
|  | 2ND PERIOD |  | ○ | ○ |  |  |  |  |  |
| MASTER STATION ② | 1ST PERIOD |  | ○ | ○ |  |  |  |  |  |
|  | 2ND PERIOD |  |  | ○ | ○ |  | ○ |  | ○ |
FIG.9
Ⓐ + + + + + − − +
Ⓑ + − + − + + − −
|  |  | 1 | 2 | 3 | 4 | 5 | 6 | 7 | 8 |
|---|---|---|---|---|---|---|---|---|---|
| 2NDARY STATION ① | 1ST PERIOD |  |  |  |  |  | ○ | ○ |  |
|  | 2ND PERIOD |  | ○ |  | ○ |  |  | ○ | ○ |
| 2NDARY STATION ② | 1ST PERIOD |  | ○ |  | ○ |  |  | ○ | ○ |
|  | 2ND PERIOD |  |  |  |  |  | ○ | ○ |  |

LORAN SIGNAL RECEIVER

BACKGROUND OF THE INVENTION

This invention relates to a loran signal receiver which detects master and secondary station pulses of a loran signal, and locates the position of reception of the loran signal on the basis of the difference in time between reception of the master and secondary station pulses.

Loran, a well-known hyperbolic curve radio navigation technique, uses a chain consisting of a single master transmission station and two or more secondary transmission stations. The master station transmits a train of 9 loran pulses, as shown at M in FIGS. 1(a) and (b), at a repetition period (99.7 ms in the Japanese maritime province)determined for the chain to which the master belongs. The secondary stations each transmit a train of 8 pulses, as shown at $S_1$, $S_2$ in the figure, at the same repetition period but with corresponding delay times (coding delays) relative to the master station pulse groups.

Each pulse of each loran pulse train has a width of 200 μs and a separation of 1 ms from adjacent pulses with the exception that the master station pulse group is punctuated by a 9th pulse 2 ms after the 8th pulse. Each pulse is generated by amplitude modulation of a 100-KHz carrier wave Ca, as shown in FIG. 1(c).

The loran receiver is designed so as to recognize and track the master and secondary station pulses M, $S_1$, $S_2$ among the received signals, seek the differences and each of the secondary $T_1$, $T_2$ between the reception times of the master station pulse train M and each of the secondary trains $S_1$ and $S_2$ and derive the intersection of loran hyperbolics traced by the reception time differences $T_1$, $T_2$ on the basis of the loran table in order to determine the position of reception of the loran signal.

Generally speaking, in order to resolve the loran pulses, the system produces sampling pulses synchronized with the loran pulses. One prior-art loran receiver having this function is disclosed in TOKKAISHO (unexamined published Japanese patent application) 55-2938. It produces a group of sampling pulses at a period of 10 μs over a group interval of 600 μs, as shown in FIG. 1(d) in response to each of which the intensity of the received signal is sampled and determines that there is a loran pulse in the received signal when the sampled data exceeds a predetermined level. In more detail, the receiver produces sampling pulses at a period of 10 μs, each of which includes a pair of pulses separated by 2.5 μs. The separation of 2.5 μs corresponds to a ¼ period of carrier Ca, so that one or the other of the pair of sampling pulses will substantially coincide with the peak value of carrier Ca, as shown by the relationship between (e) and (f) of FIG. 1.

If no loran pulse LP is sensed within the interval of 600 μs, the timing of occurrence of the sampling pulse group is shifted by 600 μs and sampling is repeated over a new interval of 600 μs. If again no loran pulse LP is sensed after this shift, the sampling pulse group is again shifted by 600 μs until a loran pulse is detected. This method of sensing loran pulses LP is repeated for each of the master and secondary station pulse trains M, $S_1$ and $S_2$.

However, in order to accurately sense the loran pulses with this prior art receiver, the sampling pulse group covering a 600 μs must be repeatedly shifted across a repetition period of 99.7 ms. A relatively long time of about 16.6 sec (99.7×99.7/0.6) is required for that purpose.

When the loran signal is received on land, it is attenuated by mountains and buildings. Reception of the loran signal is also greatly influenced by external noise from electric power supply lines. Such influences may cause the S/N ratio of the loran signal to drop to 0 dB or less, for example. Under the conditions of such a bad S/N ratio, the prior art receiver cannot reliably discriminate the loran pulses from noise.

SUMMARY OF THE INVENTION

It is an object of this invention to provide a loran receiver which rapidly senses the loran pulses accurately even under bad S/N ratio conditions.

Briefly, the loran receiver according to this invention includes sampling means which samples the polarity of a received signal at a high frequency. The data sampled at each sample point throughout a unit predetermined interval is stored in memory loans. Loran pulse determiner means retrieves data from the memory means in a pattern corresponding to the structure of a loran pulse train and the data are processed by a key corresponding to pulse coding patterns determined in advance for the master and secondary station pulses. The processed data then blantantly reflect equivalence or noncorrespondence with the predetermined pulse coding. The data retrieve pattern template is then shifted throughout the memory corresponding to two loran signal cycles until a train of key-processed data reflects equivalence with the pulse trains of master and secondary loran transmitters.

The above and other objects, features and advantages of this invention will be apparent from the following description of a preferred embodiment thereof, taken in conjunction with the accompanying drawings.

BRIEF DESCRIPTION OF THE DRAWINGS

In the drawings:

FIGS. 7A and 7B show illustrative examples of loran pulses of different phase codings;

FIGS. 8 and 9 illustrate the method of checking for a known sequence of phase polarities identifying the loran stations.

DETAILED DESCRIPTION OF THE PREFERRED EMBODIMENT

Figure 2:
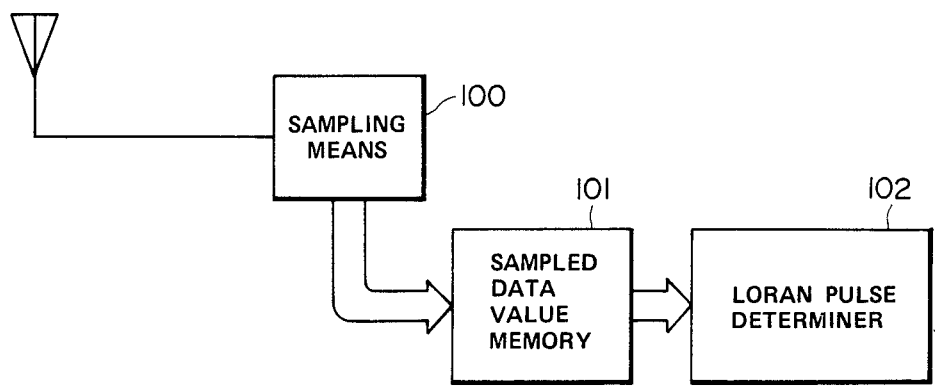
FIG. 2 is a block diagram of the basic concept of this invention.

Reference will be made to FIG. 2 which illustrates the basic concept of this invention mentioned previously in the "Summary of the Invention" of this specification.

Figure 3:
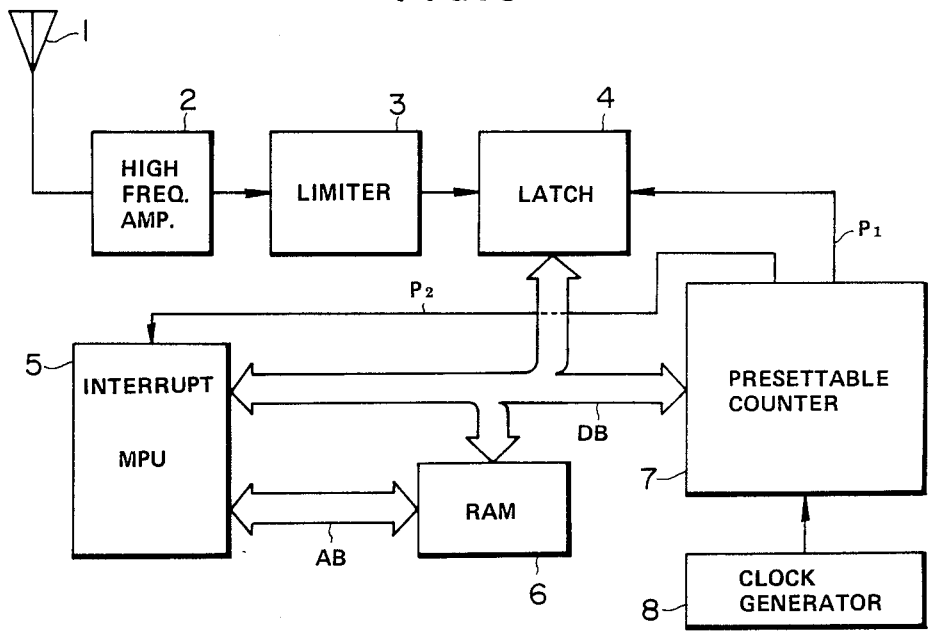
FIG. 3 is a block diagram of a preferred embodiment of a loran receiver according to this invention.

Reference will be made to FIG. 3 illustrating the embodiment of the loran receiver according to this invention. The other structures of the receiver such as a unit to calculate the difference between the reception times of the master and secondary station signals, a unit to pinpoint the position of the receiver by deriving the intersection of the loran hyperbolics traced by the reception time differences, an output unit to output the receiver position, etc., will not be described and illustrated as these are well-known and not germane to the invention.

In FIG. 3, signals, including a loran signal, are received by an antenna 1, amplified by a high-frequency amplifier 2 and then fed to a limiter 3 which converts the amplified signal to a binary signal, the value of which depends upon whether the amplified signal is greater or less than a predetermined threshold value.

A latch 4 latches the output of limiter 3 each time a sampling pulse $P_1$ from a presettable counter 7 is inputted thereto, and sends the latched data via a data bus DB to a microcomputer (MPU) 5. Antenna 1, amplifier 2, limiter 3 and latch 4 constitute the sampling means mentioned in FIG. 2.

Presettable counter 7 is preset to a value supplied by MPU 5 via data bus DB. Counter 7 counts pulses of a clock signal from a clock generator 8 up to the preset count value and then produces a first sampling pulse, followed after 2.5 $\mu$s by a second sampling pulse. Counter 7 also sends an interrupt signal $P_2$ to an interrupt terminal of MPU 5 at the end of its counting cycle.

Figure 4:
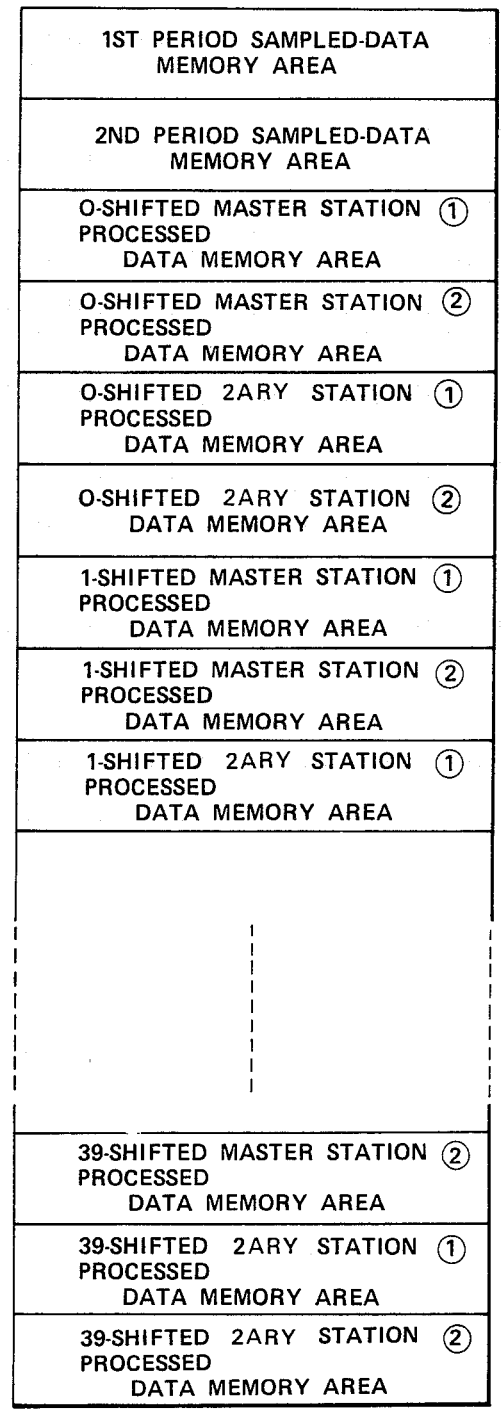
FIG. 4 illustrates the organization of the RAM of FIG. 3.

A RAM 6 stores the sampled data values from latch 4 as well as other calculated data values and is divided into memory areas such as are shown in FIG. 4 and which will be explained later.

Figure 5A:
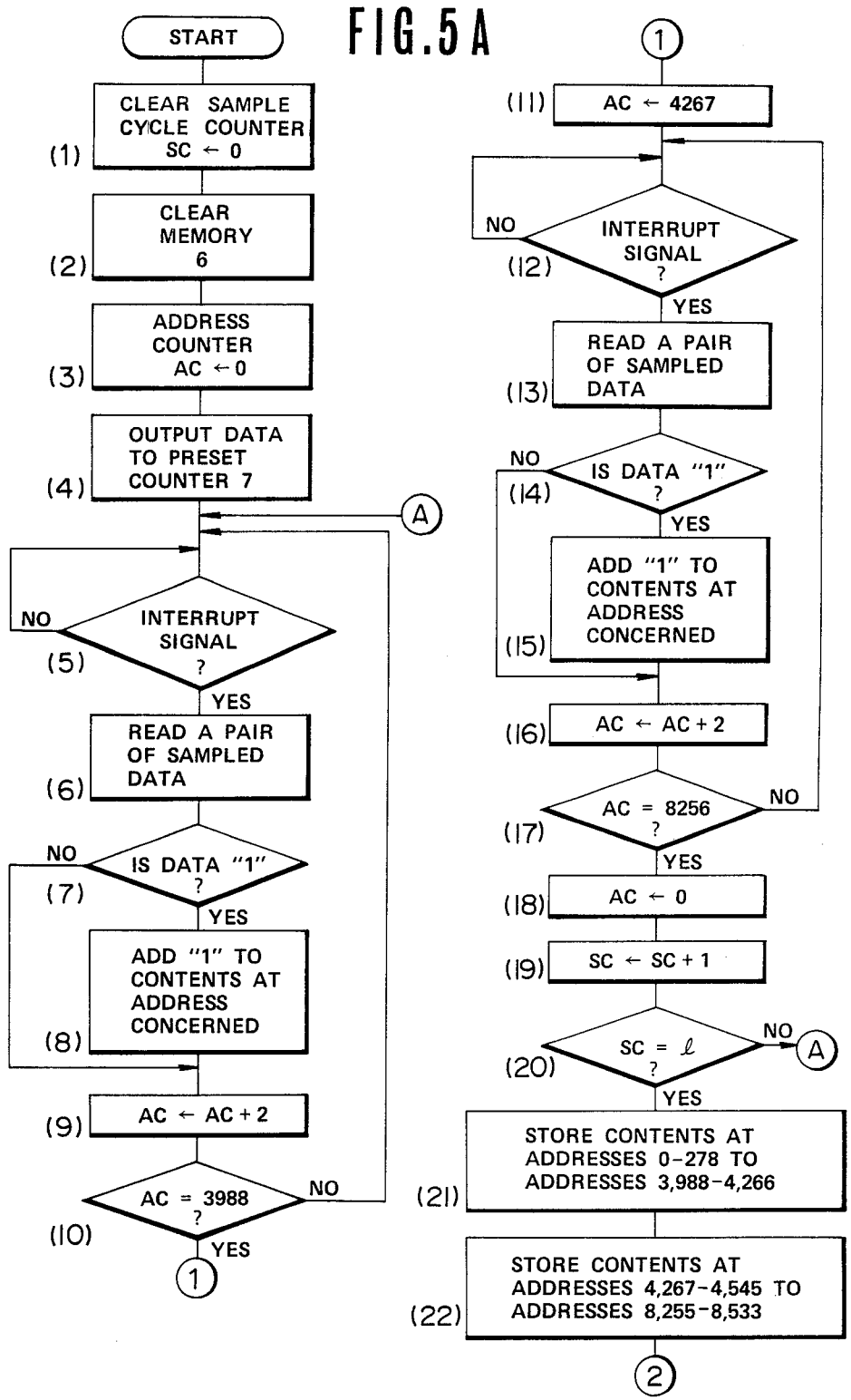
FIG. 5A and 5B together form a flowchart of a program executed by the MPU of FIG. 3.
Figure 5B:
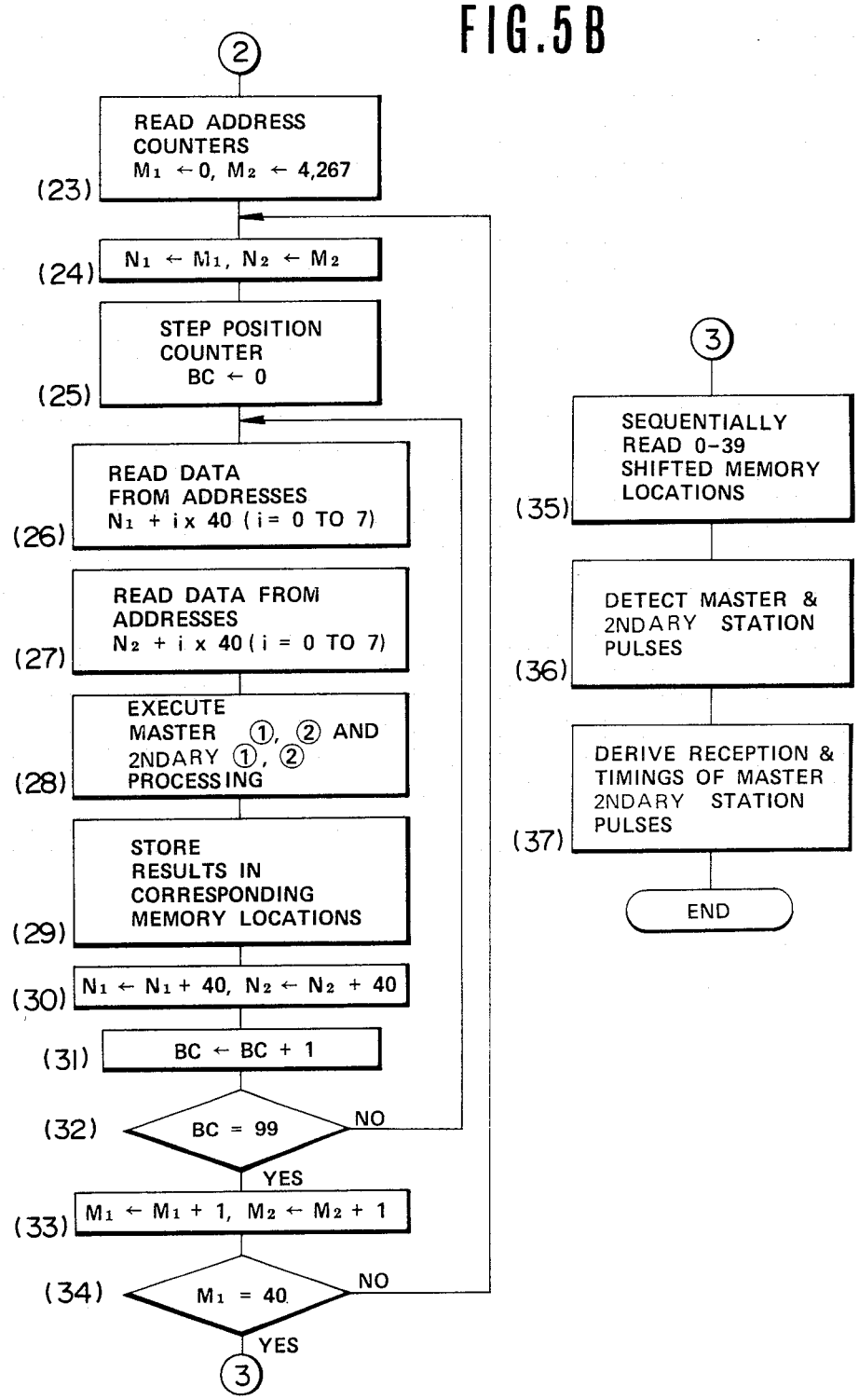

The program executed by MPU 5 as shown in FIGS. 5A and 5B can be divided roughly into three parts: storing the data values sampled by latch 4, processing the sampled data values in accordance with a predetermined phase coding and determining the master and secondary station pulses on the basis of the calculated results.

First, the process of storing the sampled data will be described. In this process, the data value sampled at each sampling point over a unit interval corresponding to the repetition period of the loran signal is stored in a corresponding memory cell. In more detail, in a step (1) of FIG. 5A, the contents of a sample cycle counter SC, not shown, is cleared, then, at a step (2), RAM 6 is cleared, and at a step (3), an address counter AC, not shown, is cleared.

At a step (4), presettable counter 7 is supplied with a preset value which causes it to count for 50 $\mu$s, corresponding to the sampling period. Presettable counter 7 produces a pair of sampling pulses $P_1$ separated by a time interval of 2.5 $\mu$s after having counted 50 $\mu$s. The pair of sampling pulses are sent to latch 4. At the same time, an interrupt signal $P_2$ is sent to an interrupt terminal of MPU 5 from counter 7.

At a step (5), MPU 5 waits for the arrival of the next interrupt signal $P_2$ at which time, at a step (6), the sampled data latched by latch 4 is read. Since the received signal is sampled in response to each of the sampling pulses $P_1$, two sampled data are read. At a step (7), it is determined whether the sampled data is 1 or 0.

If the two sampled data include a 1, 1 is added to the contents of an address of RAM 6 at a step (8). Then, at a step (9), the contents of address counter AC is incremented by two.

At a step (10), it is determined whether address counter AC has reached 3,988. If not, the program returns to step (5) and steps (5)–(10) are repeated until the contents of address counter AC reaches 3,988.

Figure 6:
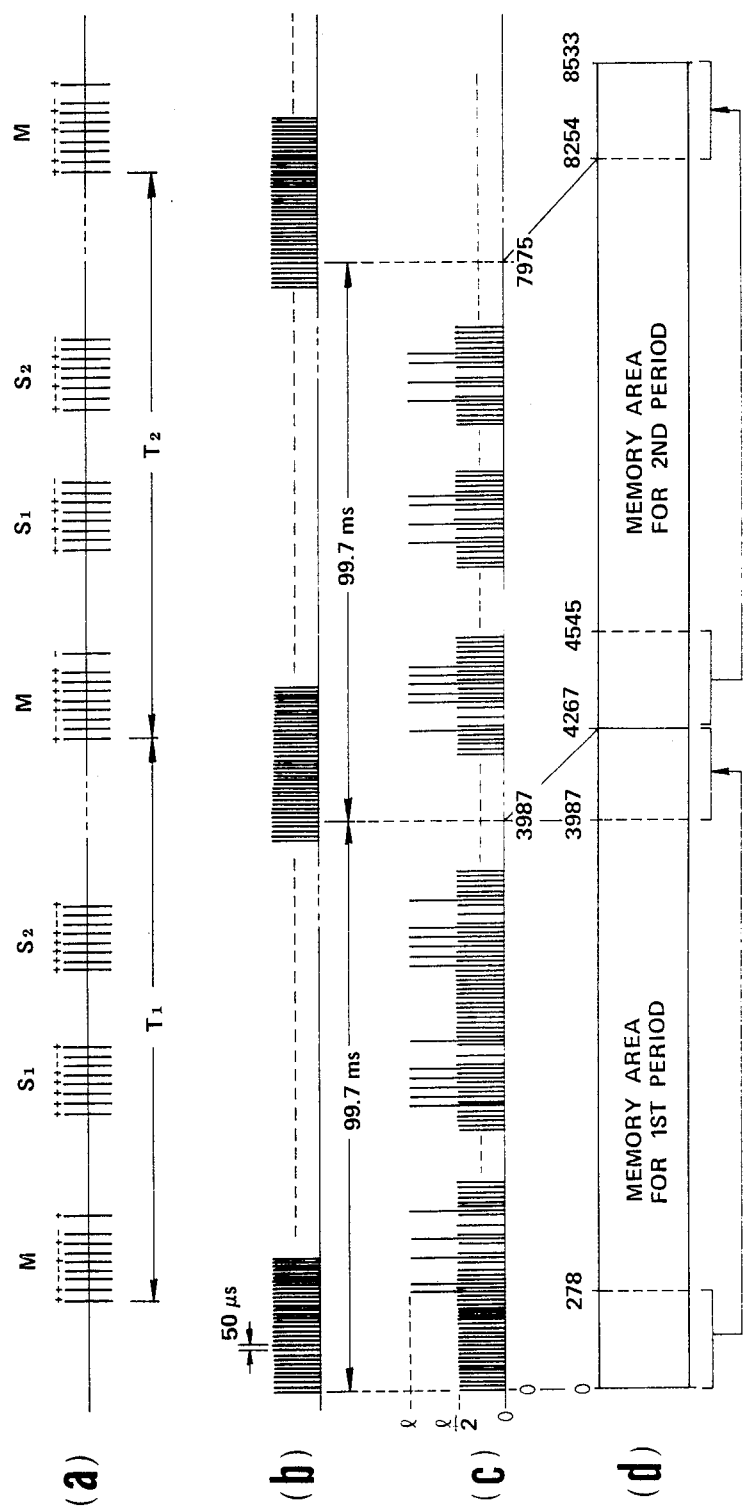
FIG. 6 illustrates the relationship between loran signal, sampling pulses and sampled data.

In this way, as shown in FIG. 6, a pulse pair is produced successively at time intervals of 50 $\mu$s. These pulse pairs sample the received signal, and the sampled data values for each sample pulse cycle of a first repetition period of the loran signal are stored in a corresponding memory address 0–3,987.

It is unclear at which time point within a repetition period of the loran signal the sampling pulses are initially produced. Therefore, it is assumed that by way of example, the sampling pulses are produced at a timing such as is shown in FIG. 6.

In step (11) subsequent to completion of the loop (5)–(10), the address counter AC is incremented by 279 to leave space for a data-manipulation process described later.

Similarly, the loop consisting of steps (12)–(17) analogous to the loop (5)–(10) is repeated to store the sampled data for the next repetition period in a second period memory area.

At a step (18), address counter AC is cleared, and at a step (19), sample cycle counter SC is incremented. At a step (20), it is determined whether counter SC has reached the value l. If not, the program returns to step (5). Thus, steps (5)–(20) are repeated l times, so that the data sampled at every 50 $\mu$s mark and accumulated l times are stored in corresponding memory addresses for two successive periods of the loran signal.

The reason why the memory area is divided into the first and second areas is that, as shown in FIG. 6(a), the phase codings of each of the master and secondary pulse trains cycle through a two-step pattern covering two successive repetition periods.

As shown in FIG. 7, it is assumed that the phase coding is designated (+) when the carrier Ca of the loran pulses has a positive polarity at the onset of the loran pulse, while the phase coding is designated (−) when the carrier Ca is 180° out of phase with the (+) coding. Then the coding pattern of the master station pulses within a first repetition period $T_1$ of FIG. 6(a) is (+ + − − + − + +) and that of the secondary station pulses is (+ + + + + − − +), the phase coding patterns of the master and secondary station pulses within the next repetition period $T_2$ are (+ − − + + + + −) and (+ − + − + + − −), respectively. These coding patterns are repeated alternatingly.

Thus, each of the addresses of the first and second period sampled data memory areas is filled with the sum of l data sampled at the same timing within l repetition periods having the same phase coding.

Consequently, the sampled data is 1 when the sampling pulse is in synchronism with the peak of a carrier wave with the phase coding (+) and the sampled data is 0 when the sampling pulse is in synchronism with the loran pulse having the phase coding (−). Thus, the contents of each memory address corresponding to a loran pulse having the phase coding (+) is l because the data taken in all of the l samples is are 1. On the other hand, the contents of each memory address corresponding to a loran pulse having the phase coding (−) is 0 because the data taken in all of the l samples is 0 (In this instance, in fact, the memory contents are not incremented). Sampling the received signal outside of the loran pulses yields nothing but noise. If the distribution of this noise is regarded as random noise following a Gaussian distribution about a zero mean value, the probabilities of whether the sampled data being 1 or 0 will each be ½. Therefore, the contents of a memory address corresponding to this noise can be assumed to have the value 1/2.

The state of the contents of the respective addresses after l times of sampling is shown in FIG. 6(c).

After the sum of the data taken in l samples is stored in each of the addresses of the first and second period memory areas, as described above, i.e. when determination is YES at a step (20), the steps (21) and (22) are executed whereby the contents of addresses 0–278 and 4,267–4,545 of the first and second period sampled data memory areas are transferred to empty memory addresses 3,988–4,266 and 8,255–8,533, respectively. These processes are executed to arrange the data in order to expedite a phase coding operation which will be described below.

After execution of step (22) of FIG. 5A, the step (23) of FIG. 5B is executed in which read address counters $M_1$ and $M_2$ (not shown) are initialized to 0 and 4,267, respectively. At a step (24), the contents of counter $M_1$ and $M_2$ are transferred to auxiliary counters $N_1$ and $N_2$ (not shown), respectively. At a step (25), the contents of step counter BC is cleared.

At a step (26), the contents of 8 addresses of the first period sampled data memory area progressively offset by 40 starting with address $N_1$ and read. That is, since, at first, the contents of counter $N_1$ is zero, values are read from addresses 0, 40, 80, 120, 160, 200, 240 and 280.

Similarly, at a step (27), 8 values are read from every 40th address of the second period sampled data memory area, starting with address $N_2$ (4,267).

The reason why data values are read from every 40th address at steps (26) and (27) is that 40 sampling pulse cycles equals the pulse separation 1 ms between two adjacent loran pulses.

At a step (28), master station (1) and (2) and secondary station (1) and (2) processings are executed. Each station processing includes a series of operations; i.e. replacement of first predetermined ones of the 8 data values read from the first period sampled data memory area with $1-D$, where D is the corresponding read data value, replacement of second predetermined ones of the 8 data values read from the second period sampled data memory area with $1-D$, and addition of the 8 resulting data values for the first period and the 8 resulting data values for the second period. Specifically, in the case of master station (1) processing shown in FIG. 8, the arithmetic operation $1-D$ is performed on the third, fourth, sixth and eighth of 8 sampled data values read from the first period sampled data memory area. Similarly, the arithmetic operation $1-D$ is performed on the second and third of 8 data values read from the second period sampled data memory area. Then, the 8 resulting data values for the first period and the 8 resulting values for the second period are added.

The points at which the processing $1-D$ is performed corresponds to the coding pattern and more particularly coincide with the master station pulses with (−) phase coding.

If all of the 8 data values read from the first period sampled data memory area correspond to the master station pulses, the read data values are (11001010) exclusive of the 9th pulse. If the arithmetic operation $1-D$ is performed on the 0's of the read data values, $1-0=1$ with the result that the 8 resulting values are (11111111).

If the 8 data values read from the first period sampled data memory area correspond to the master station pulses, the 8 data values read from the second period sampled data memory area will also correspond to master station pulses with a different coding pattern, namely (10011111) exclusive of the 9th pulse. If the processing $1-D$ were performed on the 2nd and 3rd data values, similarly, the 8 resulting data values would be (11111111). Thus, after the $1-D$ operation, the sum of the 16 data values is 16 l.

On the other hand, if there are not data values corresponding to the loran pulses among the 8 read data values, or if the number of data values corresponding to the loran pulses is 7 or less, not all of the data values on which the $1-D$ operation is performed will be 0. Therefore, if these data values correspond to noise, $1-1/2=1/2$ while if these data values correspond to the loran pulses represented by (+), $1-1=0$. Thus, the sum of 16 data values will necessarily be less than 16 l, but not 0.

The master station (1) processing should be effected since the contents of addresses of the first and second period sampled data memory areas may correspond to the first and second repetition periods $T_1$ and $T_2$, respectively, of FIG. 6(a). However, the master station (2) processing should be performed since the first and second sampled data memory areas may correspond to $T_2$ and $T_1$, which can easily occur.

Accordingly, if the 8 data values read from the first period sampled data value memory area correspond to the master station pulses within the $T_2$ interval, namely (10011111), and if the 8 data values read a from the second period sampled data value memory area correspond to the master station pulses within the $T_1$ interval, namely (11001010), the summation of the 16 data values results in 16 l after the $1-D$ operation is performed on the fixed positions of the 8 data values.

The secondary station (1) and (2) processing is performed in a manner similar to that of the master station (1) and (2) processing, i.e., the arithmetic operation is performed on 0 places corresponding to the pattern of the secondary station pulse phase coding and the 16 resulting values are totalled. If, as a result, all of the read data values corresponds to the secondary station pulses, the result will be 16 l; otherwise, the result will necessarily be less than 16 l.

At a step (29), the results of the master station (1), (2) and secondary station (1), (2) processing are stored in a so-called 0-shifted master station (1), (2) memory area and in 0-shifted secondary station (1), (2) memory area, respectively, as shown in FIG. 4.

At a step (30), the contents of auxiliary counters $N_1$ and $N_2$ (not shown) are incremented by 40 and at a step (31), step position counter BC is incremented by 1. At a step (32), counter BC is checked to see whether or not its value has reached 99. If not, the loop (26)–(32) is again executed.

Thus, the loop (26)–(32) is repeated 99 times. That is, as shown in FIG. 9, first, 8 data values are read from addresses of the first period sampled data memory area, the addresses starting with 0 and increasing by 40, and 8 data values are read from addresses of the second period sampled data memory area, the addresses starting with 4,267 and increasing by 40. Second, 8 sampled data are read from addresses of the first period sampled data memory area, the addresses starting with 40 and inreasing by 40, and 8 data values are read from addresses of the second period sampled data memory area, and addreses starting with 4,307 and increasing by 40. Thereafter, the starting read address is stepped up by 40 each cycle. Thus, in the 99th cycle, data values are read from addresses 3,920, 3,960, 4,000, 4,040, 4,080, 4,120, 4,160 and 4,200 of the first period sampled data memory area, and data values are read from addresses 8,187, 8,227, 8,267, 8,307, 8,347, 8,387, 8,427 and 8,467 of the second period sampled data memory area.

Thus, 99 operation results derived in the above 99 cycles are stored in each of the 0-shift master station (1) memory area through the 0-shift secondary station (2) memory area.

When step position counter BC reaches 99 and the result at step (32) is YES, the step (33) is executed in which read address counters $M_1$ and $M_2$ are each incremented by one. Then, at a step (34), counter $M_1$ is checked to see whether it has reached 40. If the result is NO, the process returns to step (24).

Thus, the outer loop (24)–(34) is repeated 40 times.

That is, in the first cycle, reading of data values from the sampled data memory area started from address 0 and 4,267: in the second cycle, it starts from addresses 1 and 4,268: in the third cycle, it starts from addresses 2 and 4,269, and so on. That is, the starting read addresses are progressively shifted by one. For each address shift, 99 cycles of the master station (1), (2) and secondary station (1), (2) processing is executed, and the operation results are stored in corresponding addresses of 0-39-shifted areas.

Shifting the data value starting read address by one through the entire 40-pulse sampling group prevents failure to recognize data values which might otherwise occur if the data values were only read out at every 40th address at steps (26) and (27).

The reason why the first 279 data values of the first and second sampled data memory areas are transferred to empty areas at the ends of the corresponding memory areas is to get a complete set of 8 data values from addresses of the first and second period sampled data memory areas, when the starting addresses are 3,987 and 8,254, corresponding to the end of the loran pulse repetition period and increasing by 40, since there is a possibility that addresss 3,986 of the first period sampled data memory area corresponds to the first of the master or secondary station pulses.

As described above, 8 data values are read from each of the two sampled data memory areas at intervals (40 addresses) corresponding to the separation between loran pulses and processing in accordance with the phase coding of the master and secondary station pulses is performed on the 8 read data values. In the master station (1), (2) processing, the operation result is 16l only when the data values corresponding to the master station pulses are read while in the secondary station (1), (2) processing, the result is 16l only when the data values corresponding to the secondary station pulses are read. As an example, it is assumed the data values read from the first and second sampled data memory areas at intervals of 40 addresses are arranged as shown in FIGS. 10 and 11 where the upper and lower data value trains are read from the first and second sampled data memory areas, respectively, and the data values represented by "N" correspond to noise, the value of which is 1/2.

Figure 10:
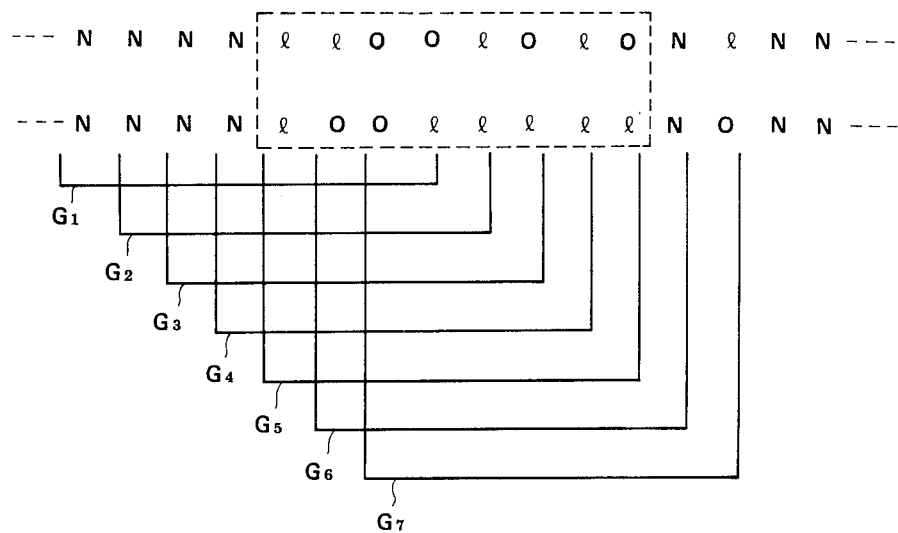
FIGS. 10–13 illustrate examples of arrangement of the sampled data read from the RAM to check for a known phase sequence.
Figure 11:
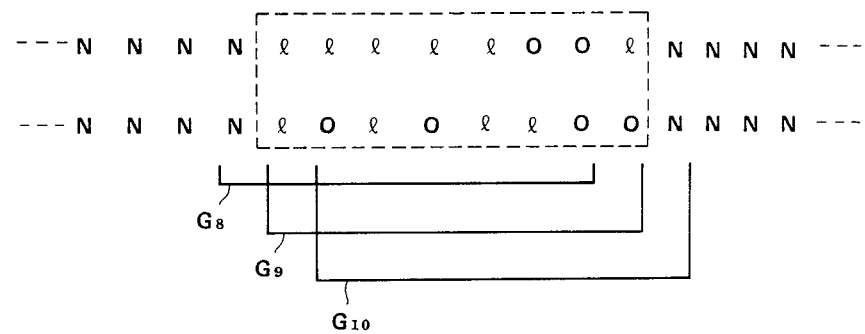

For example, if a data value group such as shown by $G_1$ in FIG. 10 is read and the operation 1−D is performed on the third, fourth, sixth and eighth data values of the upper data value train a (NNNN1100), the resulting data value train is (NNNN1001). When the operation 1−D is performed on the second and third data values of the lower train (NNNN100N), the resulting data train is (NNNN1001). Consequently, the sum of 16 data values (NNNN1001)+(NNNN1001)=8l.

On the other hand, when the data value group $G_5$ corresponding to the master station pulses surrounded by broken lines in FIG. 10 is read, the operation result is 16 l, as explained above.

In the master station processing, even if the data value group $G_5$ corresponds to the master station pulses, the obtained result may not be 16 l. That is, if the second and third data values of the upper data value train (11001010) are changed, the resulting data value train is (10101010) while the third, fourth, sixth and eighth data values of the lower data value train (10011111) are changed, so that the resulting data train would be (10101010). The sum of these resulting data value trains is 8 l.

In addition, if the read data train represents a secondary pulse group, the result will not be 16 l. For example, if the first period memory area corresponds to the repetition period $T_1$ as shown in FIG. 6 (a) so that the data value trains are as those shown, surrounded by broken lines in FIG. 11, the third, fourth, sixth and eighth data values of the upper data value train (11111001) would be changed so as to result in (11001100); the second and third data values of the lower data value train (10101100) would be changed so as to result in (11001100); and the sum of these trains would be 8 l.

Similarly, when the master station (2) processing is performed on the data value group $G_9$ corresponding to the secondary station pulses, the second and third data values of the upper data value train (11111001) are changed so as to result in (10011001); the third, fourth, sixth and eighth data values of the lower data value train (10101100) are changed so as to result in (10011001); and the sum of these train is 8 l.

On the other hand, when the repetition period $T_1$ corresponds to the second period sampled data value memory area, only when the master station (2) processing is performed on the data value group corresponding to the loran pulses, the result wil be 16 l.

That is, since the upper and lower data value trains of FIG. 10 are reversed, the data value train (10011111) is read from the first period sampled data memory area, the second and third data values of the read data (11001010) is read from the second period sampled data memory area, the third, fourth, sixth and eighth data values of the last-mentioned train are changed; and the sum of these data values if 16 l. On the other hand, when the main station (1) processing is performed on the data value trains, the result is 8 l.

Figure 1:
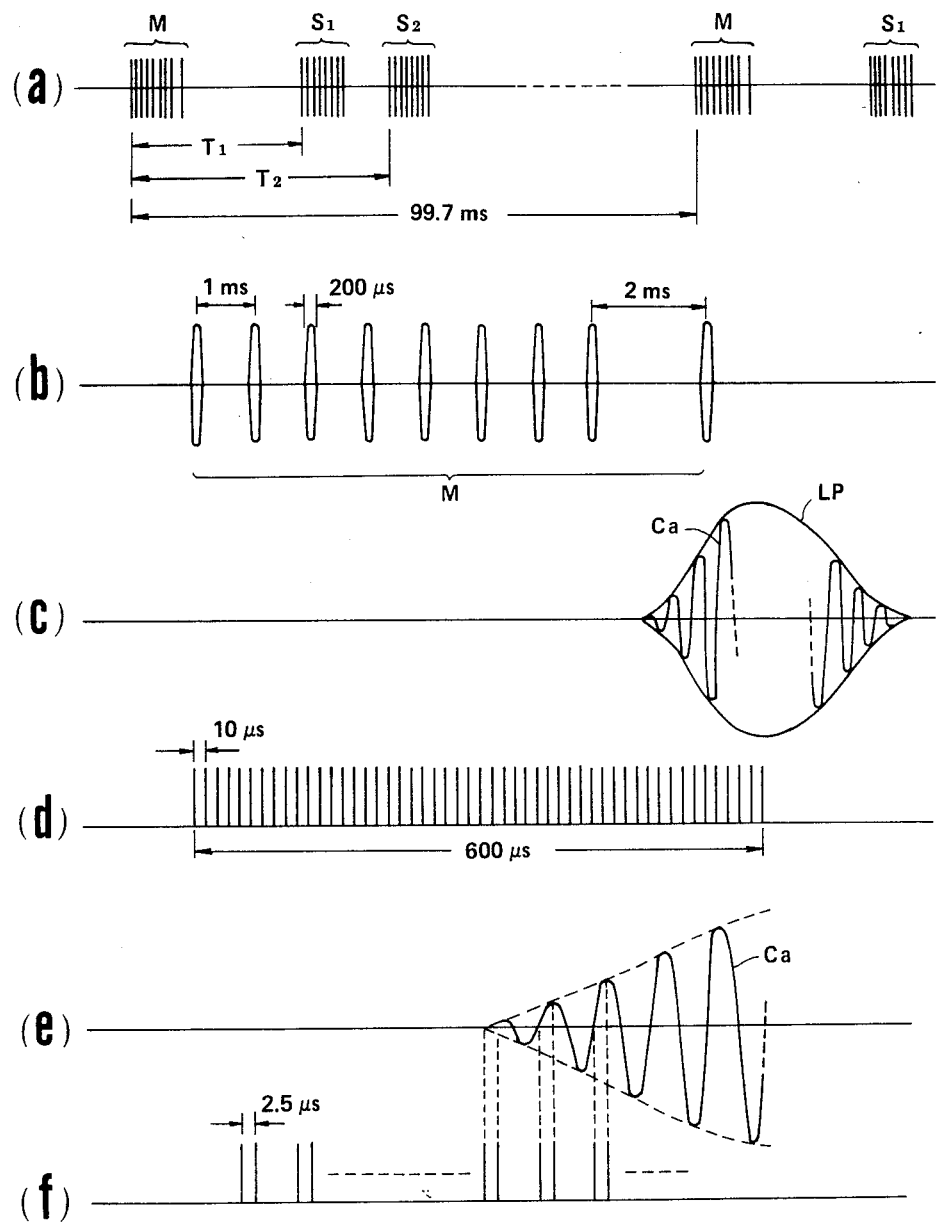
FIG. 1, as described above, illustrates the general characteristics of the loran signal and one method of resolving the loran pulses used in a prior art loran receiver.

The above description handles the case when the sampling pulse pair is synchronized with the peaks of the carrier Ca such as is shown in FIG. 1(e) and (f). However, the sampling pulse pair are just as likely to be synchronized with the troughs, i.e. the negative peaks of carrier Ca.

In the latter case, the sampled data values corresponding to the loran pulses are reversed from those of the former case; equal to what would result by changing the contents 1 and 0 to the contents 0 and 1, respectively in FIG. 6(c). The contents at the addresses corresponding to noise are similarly 1/2.

Figure 12:
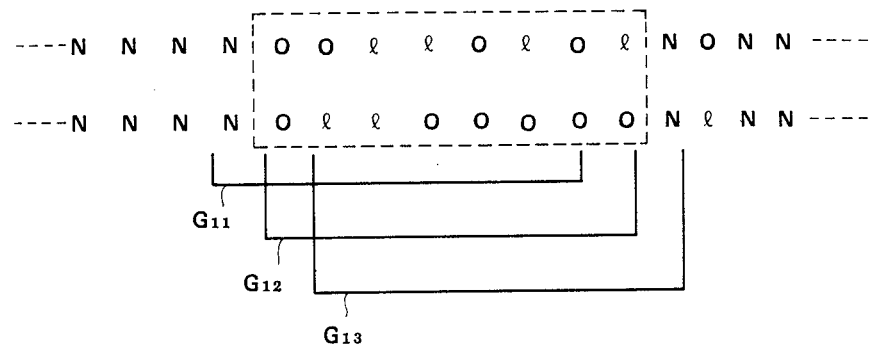
Figure 13:
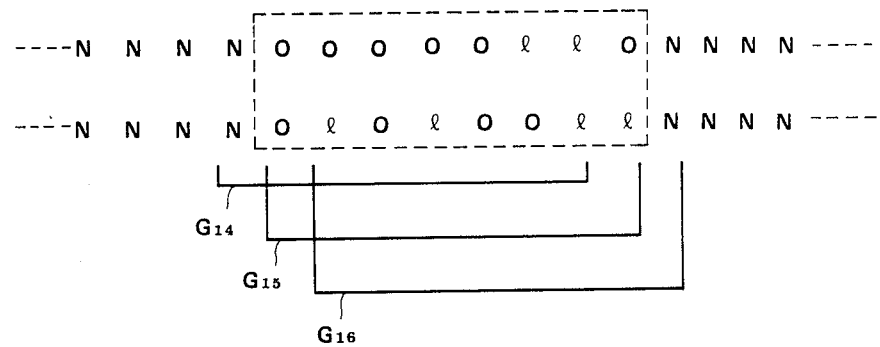

Thus, the obtained results of the master and secondary station (1), (2) processing are such that when the data values corresponds to the master or secondary station pulses, the sum of these data values will be 0 while otherwise, the sum is not zero (and not 16 l). In more detail, as an example, assume that the data value trains read from the above two sampled data memory areas are as shown in FIGS. 12 and 13. If the master station (1) processing is performed on the data value group $G_{12}$ corresponding to the master station pulses surrounded by broken lines of FIG. 12, the third, fourth, sixth and eighth data values of the upper data value train (00110101) are changed so as to result in (00000000) while the second and third data values of the lower data value train are changed to result in (00000000), and the sum of these resulting data values is 0.

In contrast, in the case of the data value groups $G_{11}$ and $G_{13}$ in which the data values corresponding to noise are included, and in the case of the data value group $G_{15}$ corresponding to the secondary station pulses surrounded by broken lines of FIG. 13, the resulting sum will not be 0. Similarly, in the case of the master station (2) processing and the secondary station (1), (2) processing, the resulting sum of only the data value groups corresponding to the loran pulses is 0.

When the master station (1), (2) processing and secondary station (1), (2) processing are performed on all combinations of 8 appropriately spaced data values of the first and second sampled data memory areas, determination at a step (34) of FIG. 5B is YES, and control passes to a step (35). In this step, the contents of the 0-39 shifted memory areas in which the above operation results are stored are sequentially accessed. At a step (36), it is determined if the read operation result is either "16 l" or 0. If the operation result is equal to "16 l" or 0, it is determined whether the operation result was derived from processing of the master station pulses or from processing of the secondary station pulses, depending on which operation result memory area the data values were read.

At a step (37), it is determined from which addresses of the first and second period sampled data memory areas the data values were read the used to derive results reflecting the master and secondary station pulses, by recognizing the addresses of the operation result memory areas in which the results indicating the master and secondary station pulses are stored. The reception timing of the master and secondary station pulses can then be derived from the addresses of the first and second period sampled data memory areas.

Thus, the subsequent tracking operation and calculation of the reception timing of the loran signals can be performed on the basis of the reception timing data found at step (37). As described above, in the particular embodiment of this invention, the reception signal is sampled at intervalss of 50 μs by a pair of sampling pulses, the sampleddata are stored over a time base covering twice the loran signal period, and then the loran pulses are detected by processing according to known phase codings. Thus, it is unnecessary to successively move the sampling pulse group by a predetermined time width in order to resolve the loran pulses, thereby greatly shortening the time required to lock onto the loran pulses.

For example, if the number l of sample cycles in the above embodiment is 13, the time required to get a complete set of data values sufficient to lock onto the loran pulses is 1×one repetition period=13×99.7 ms ×2=2.6 sec. which means a very quick processing compared to the prior art processing which takes about 16.6 sec.

To resolve loran pulses from the sampled data values, the prior art apparatus checks for when the sampled data is above a predetermined level, while the embodiment of this invention checks for when the sum of 16 sampled data values is above a predetermined level, so that the value of a single data used for level determination is the total of the sampled data (13×16=208), thereby resulting in a S/N ratio improvement of $\sqrt{208} \approx 23$ dB.

It should be noted that the period of the sampling pulses and the structure of the memory area are not limited to the above embodiment.

According to this invention, when the attenuation of the loran signal and/or the level of noise are great, such as is the case in reception of the loran signal on land, accurate detection of the loran pulses is still possible.

While this invention has been shown and described with respect to a preferred embodiment thereof, it should be noted that various changes and modifications could be made by those skilled in the art without departing from the scope of this invention as set forth in the attached claims.

What is claimed is:

1. A loran-C signal receiver comprising:
   (a) a sample means for periodically sampling a received signal containing a loran-C signal in response to sampling pulses produced periodically in synchronism with the carrier wave of the loran-C signal to produce sampled data values;
   (b) a memory means;
   (c) a computer means for:
      (1) storing the data values sampled in two successive periods of the loran-C signal in corresponding first and second period areas of said memory means;
      (2) adding the sampled data values of the next successive pair of periods of the loran-C signal to corresponding sampled data values stored in said memory;
      (3) repeating the adding operation for a plurality of subsequent first and second periods of the loran-C signal;
      (4) reading groups of a fixed number of totalled values from the memory, the fixed number matching the number of pulses in each loran pulse group, the totalled values being read from memory addresses separated in coincidence with the separation of pulses in each loran pulse group;
      (5) processing each group of read values in accordance with the known phase codinng of each group of loran pulses, the processing indicating whether every value of the group matches the known phase of any of the loran pulse group;
      (6) repeating the reading and processing steps until every possible combination of totalled values satisfying the separation criterion has been processed; and
      (7) locating each of the loran pulse groups within each pair of successive loran-C signal periods according to which groups of values exactly match the known phase coding of each loran-C pulse group.

2. A loran-C receiver according to claim 1, wherein said sample means includes a presettable counter having a count set by said computer for producing a sampling pulse when said counter has counted clock pulses up to the set count, a latch means repsonsive to the sampling pulse for sampling the received signal, and a limiter means for shaping the reeived signal into a digital value which is inputted for sampling to said latch means.

3. A loran-C signal receiver comprising:
  (a) a sample means for periodically sampling a received signal containing a loran-C signal in response to sampling pulses produced periodically in synchronism with the carrier wave of the loran-C signal to produce sampled data values;
  (b) a memory means;
  (c) a computer means for:
    (1) storing the data values sampled in two successive periods of the loran-C signal in corresponding first and second period areas of said memory means;
    (2) adding the sampled data values for the next successive pair of periods of the loran-C signal to corresponding sampled data values stored in said memory;
    (3) repeating the adding operation for a plurality of subsequent first and second periods of the loran-C signal;
    (4) reading groups of a fixed number of totalled values from the memory, the fixed number matching the number of pulses in each loran pulse group, the totalled values being read from memory addresses separated in coincidence with the separation of pulses in each loran pulse group;
    (5) processing each group of read values in accordance with the known phase coding of each group of loran pulses, the processing indicating whether every value of the group matches the known phase of any of the loran pulse groups;
    (6) repeating the reading and processing steps until every possible combination of totalled values satisfying the separation criterion has been processed; and
    (7) locating each of the loran pulse groups within each pair of successive loran-C signal periods according to which groups of values exactly match the known phase coding of each loran-C pulse group.

4. A loran-C signal receiver comprising:
  (a) a sample means for periodically sampling a received signal containing a loran-C signal in response to sampling pulses produced periodically in synchronism with the carrier wave of the loran-C signal to produce sampled data values;
  (b) a memory means;
  (c) a computer means for:
    (1) storing the data values sampled in two successive periods of the loran-C signal in corresponding first and second period areas of said memory means;
    (2) adding the sampled data values for the next successive pair of periods of the loran-C signal to corresponding sampled data values stored in said memory;
    (3) repeating the adding operation for a plurality of subsequent first and second periods of the loran-C signal;
    (4) reading first and second groups each including a fixed number of totalled values from the first and second period areas, respectively, of the memory, the fixed number matching the number of pulses in each loran pulse group, the totalled values being read from memory addresses separated in coincidence with the separation of pulses in each loran pulse group;
    (5) processing each of the first and second groups of read values in accordance with the known phase coding of each group of loran pulses, adding the processed values of the first and second groups and storing the added value in a corresponding address of said memory;
    (6) repeating the steps (4) and (5) until every possible combination of totalled values satisfying the separation criterion has been processed; and
    (7) locating each of the loran pulse groups within each pair of successive loran-C signal periods according to which groups of values exactly match the known phase coding of each loran-C pulse group.

5. A loran-C receiver claimed in claim 4, wherein said processing step (5) includes replacement of some of the values in each of the first and second groups, selected according to the known phase coding of each of the master and secondary loran-C pulse groups, with $1-D$, where 1 is the number of times said adding operation is repeated in step (4) and D is the read data value;

6. A loran-C signal receiver claimed in claim 4, wherein said locating step (7) includes reading the stored added data values, determining whether the read data value equals a predetermined value, and if so, determining which of the master and secondary loran pulses the read data value represents according to which of the known phase codings the processing step is currently using, and deriving the timings of the master and secondary pulses from the addresses of the corresponding representative read data values.

7. A method of detecting pulses of a loran-C signal comprising the steps of:
  (a) periodically sampling a received signal containing a loran-C signal in response to sampling pulses produced periodically in synchronism with the carrier wave of the loran-C signal to produce sampled data values;
  (b) adding the sampled data values at the same sampled phase for a plurality of successive pairs of periods of the loran-C signal;
  (c) processing groups of a fixed number of totalled sampled data values in accordance with the known phase coding of each group of loran pulses, the fixed number matching the number of pulses in each loran pulse group, the totalled values being separated in coincidence with the separation of pulses in each loran pulse group; and
  (d) locating each of the loran pulse groups within each pair of successive loran-C signal periods according to which groups of values exactly match the known phase coding of each loran-C pulse group.

8. A method claimed in claim 7, further including the step of storing the data values sampled in two successive periods of the loran-C signal in corresponding first and second period areas of a memory means between the steps (a) and (b).

9. A method claimed in claim 8, further including the step of reading groups of a fixed number of totalled values of the memory betwen the steps (b) and (c).

10. A method of detecting pulses of a loran-C signal comprising the steps of:

(a) periodically sampling a received signal containing a loran-C signal in response to sampling pulses produced periodically in synchronism with the carrier wave of the loran-C signal to produce sampled data values;

(b) storing the data values sampled in two successive periods of the loran-C signal in corresponding first and second period areas of a memory means;

(c) adding the sampled data values for the next successive pair of periods of the loran-C signal to corresponding sampled data values stored in said memory;

(d) repeating the adding operation for a plurality of subsequent first and second periods of the loran-C signal;

(e) reading groups of a fixed number of totalled values from the memory, the fixed number matching the number of pulses in each loran pulse group, the totalled values being read from memory addresses separated in coincidence with the separation of pulses in each loran pulse group, the totalled values being read from memory addresses separated in coincidence with the separation of pulses in each loran pulse group;

(f) processing each group of read values in accordance with the known phase coding of each group of loran pulses, the processing indicating whether every value of the group matches the known phase of any of the loran pulse groups;

(g) repeating the reading and processing steps until every possible comination of totalled values satisfying the separation criterion has been processed; and (h) locating each of the loran pulse groups within each pair of successive loran-C signal periods according to which groups of value exactly match the known phase coding of each loran-C pulse group.

11. A method of detecting pulses of a loran-C signal comprising the steps of:

(a) periodically sampling a received signal containing a loran-C signal in response to sampling pulses produced periodically in synchronism with the carrier wave of the loran-C signal to produce sampled data values;

(b) storing the data values sampled in two successive periods of the loran-C signal in corresponding first and second period areas of a memory means;

(c) adding the sampled data values for the next successive pair of periods of the loran-C signal to corresponding sampled data values stored in said memory;

(d) repeating the adding operation for a plurality of subsequent first and second periods of the loran-C signal;

(e) reading first and second groups each including a fixed number of totalled values from the first and second period areas, respectively, of the memory, the fixed number matching the number of pulses in each loran pulse group, the totalled values being read from memory addresses separated in coincidence with the separation of pulses in each loran pulse group;

(f) processing each of the first and second groups of read values in accordance with the known phase coding of each group of loran pulses, adding the processed values of the first and second groups and storing the added value in a corresponding address of said memory;

(g) repeating the steps (e) and (f) until every possible combination of totalled values satisfying the separation criterion has been processed; and (h) locating each of the loran pulse groups within each pair of succesive loran-C signal periods according to which groups of values exactly match the known phase coding of each loran-C pulse group.

12. A method claimed in claim 11, wherein said processing step includes replacement of some of the values in each of the first and second groups, selected according to the known phase coding of each of the master and secondary loran-C pulse groups, with $l-D$, where $l$ is the number of times said adding operation is repeated in step (d) and D is the read data value.

13. A method claimed in claim 11, wherein said locating step includes reading the stored added data values, determining whether the read data value equals a predetermined value, and if so, determining which of the master and secondary loran pulses the read data value represents according to which of the known phase codings the processing step is currently using, and deriving the timings of the master and secondary pulses from the addresses of the corresponding representative read data values.

* * * * *